(12) United States Patent
Duthaler et al.

(10) Patent No.: US 7,561,324 B2
(45) Date of Patent: Jul. 14, 2009

(54) ELECTRO-OPTIC DISPLAYS

(75) Inventors: Gregg M. Duthaler, Needham, MA (US); Karl R. Amundson, Cambridge, MA (US); Barrett Comiskey, Palo Alto, CA (US); Holly G. Gates, Somerville, MA (US); Alberto Goenaga, Nashua, NH (US); John E. Ritter, Westford, MA (US); Michael L. Steiner, Methuen, MA (US); Russell J. Wilcox, Natick, MA (US); Robert W. Zehner, Arlington, MA (US); Anthony Edward Pullen, Belmont, MA (US)

(73) Assignee: E Ink Corporation, Cambridge, MA (US)

( * ) Notice: Subject to any disclaimer, the term of this patent is extended or adjusted under 35 U.S.C. 154(b) by 696 days.

(21) Appl. No.: 10/605,024

(22) Filed: Sep. 2, 2003

(65) Prior Publication Data

US 2004/0155857 A1  Aug. 12, 2004

Related U.S. Application Data (60) Provisional application No. 60/319,516, filed on Sep. 3, 2002.

(51) Int. Cl.
  *G02B 26/00* (2006.01)
  *G02F 1/29* (2006.01)
  *G02F 1/00* (2006.01)
  *G02F 1/03* (2006.01)

(52) U.S. Cl. ............... 359/296; 359/315; 359/322; 359/245

(58) Field of Classification Search ............... 359/315, 359/316, 321, 322, 245, 242, 252, 253, 296
See application file for complete search history.

(56) References Cited

U.S. PATENT DOCUMENTS

| 3,391,014 A | 7/1968 | Fauser | 430/45 |
| 3,668,106 A | 6/1972 | Ota | 358/305 |
| 3,756,693 A | 9/1973 | Ota | 345/107 |

(Continued)

FOREIGN PATENT DOCUMENTS

EP  0240226 B1  11/1996

(Continued)

OTHER PUBLICATIONS

Amundson et al., Flexible, Active-Matrix Display Constructed Using a Microencapsulated Electrophoretic Material and an Organic-Semiconduc, SID 01 Digest, Jun. 2001, p. 160.

(Continued)

*Primary Examiner*—Alicia M Harrington
*Assistant Examiner*—Brandi N Thomas
(74) *Attorney, Agent, or Firm*—David J. Cole (57) ABSTRACT

The invention provides an electrophoretic medium comprising at least two types of particles having substantially the same electrophoretic mobility but differing colors. The invention also provides article of manufacture comprising a layer of a solid electro-optic medium, a first adhesive layer on one surface of the electro-optic medium, a release sheet covering the first adhesive layer, and a second adhesive layer on an opposed second surface of the electro-optic medium.

19 Claims, 4 Drawing Sheets

U.S. PATENT DOCUMENTS

| | | | | |
|---|---|---|---|---|
| 3,767,392 | A | 10/1973 | Ota | 430/35 |
| 3,772,013 | A | 11/1973 | Wells | 430/34 |
| 3,792,308 | A | 2/1974 | Ota | 315/150 |
| 3,870,517 | A | 3/1975 | Ota et al. | 430/38 |
| 3,892,568 | A | 7/1975 | Ota | 430/19 |
| 3,959,906 | A | 6/1976 | Norris, Jr. et al. | 40/595 |
| 4,093,534 | A | 6/1978 | Carter et al. | 359/296 |
| 4,160,257 | A | 7/1979 | Carrish | 347/127 |
| 4,272,596 | A | 6/1981 | Harbour et al. | 430/37 |
| 4,418,346 | A | 11/1983 | Batchelder | 340/787 |
| 4,522,472 | A | 6/1985 | Liebert et al. | 359/296 |
| 4,550,982 | A | 11/1985 | Hirai | 359/274 |
| 4,602,263 | A | 7/1986 | Borror et al. | 503/201 |
| 4,655,897 | A | 4/1987 | DiSanto et al. | 359/296 |
| 4,703,573 | A | 11/1987 | Montgomery et al. | 40/455 |
| 4,742,345 | A | 5/1988 | DiSanto et al. | 345/107 |
| 4,746,917 | A | 5/1988 | DiSanto et al. | 345/107 |
| 5,250,938 | A | 10/1993 | DiSanto et al. | 345/107 |
| 5,276,438 | A | 1/1994 | DiSanto et al. | 345/107 |
| 5,288,433 | A | 2/1994 | Stevens | 252/583 |
| 5,293,528 | A | 3/1994 | DiSanto et al. | 345/107 |
| 5,378,404 | A | 1/1995 | Han et al. | 252/500 |
| 5,402,145 | A | 3/1995 | DiSanto et al. | 345/107 |
| 5,412,398 | A | 5/1995 | DiSanto et al. | 345/107 |
| 5,467,107 | A | 11/1995 | DiSanto et al. | 345/107 |
| 5,484,292 | A | 1/1996 | McTaggart | 434/317 |
| 5,485,176 | A | 1/1996 | Ohara et al. | 345/107 |
| 5,548,282 | A | 8/1996 | Escritt et al. | 340/825.35 |
| 5,745,094 | A | 4/1998 | Gordon, II et al. | 345/107 |
| 5,760,761 | A | 6/1998 | Sheridon | 345/107 |
| 5,777,782 | A | 7/1998 | Sheridon | 359/296 |
| 5,808,783 | A | 9/1998 | Crowley | 359/296 |
| 5,825,526 | A | 10/1998 | Bonmarito et al. | 359/296 |
| 5,872,552 | A | 2/1999 | Gordon, II et al. | 345/107 |
| 5,930,026 | A | 7/1999 | Jacobson et al. | 359/296 |
| 5,961,804 | A | 10/1999 | Jacobson et al. | 204/606 |
| 6,017,584 | A | 1/2000 | Albert et al. | 427/313.3 |
| 6,025,896 | A | 2/2000 | Hattori et al. | 349/86 |
| 6,054,071 | A | 4/2000 | Mikkelsen, Jr. | 264/1.36 |
| 6,055,091 | A | 4/2000 | Sheridon et al. | 359/296 |
| 6,067,185 | A | 5/2000 | Albert et al. | 359/296 |
| 6,097,531 | A | 8/2000 | Sheridon | 359/296 |
| 6,105,290 | A | 8/2000 | Coates et al. | 40/518 |
| 6,117,368 | A | 9/2000 | Hou | 252/572 |
| 6,118,426 | A | 9/2000 | Albert et al. | 345/107 |
| 6,120,588 | A | 9/2000 | Jacobson | 106/31.16 |
| 6,120,839 | A | 9/2000 | Comiskey et al. | 427/213.3 |
| 6,124,851 | A | 9/2000 | Jacobson | 345/206 |
| 6,128,124 | A | 10/2000 | Silverman | 359/296 |
| 6,130,773 | A | 10/2000 | Jacobson et al. | 359/296 |
| 6,130,774 | A | 10/2000 | Albert et al. | 359/296 |
| 6,137,467 | A | 10/2000 | Sheridon et al. | 345/107 |
| 6,144,361 | A | 11/2000 | Gordon, II et al. | 345/107 |
| 6,147,791 | A | 11/2000 | Sheridon | 359/296 |
| 6,151,153 | A | 11/2000 | Bryan | |
| 6,172,798 | B1 | 1/2001 | Albert et al. | 359/296 |
| 6,177,921 | B1 | 1/2001 | Comiskey et al. | 345/107 |
| 6,184,856 | B1 | 2/2001 | Gordon, II et al. | 345/107 |
| 6,225,971 | B1 | 5/2001 | Gordon, II et al. | 345/107 |
| 6,232,950 | B1 | 5/2001 | Albert et al. | 345/107 |
| 6,241,921 | B1 | 6/2001 | Jacobson et al. | 264/1.36 |
| 6,249,271 | B1 | 6/2001 | Albert et al. | 345/107 |
| 6,252,564 | B1 | 6/2001 | Albert et al. | 345/1.3 |
| 6,262,706 | B1 | 7/2001 | Albert et al. | 345/107 |
| 6,262,833 | B1 | 7/2001 | Loxley et al. | 359/296 |
| 6,271,823 | B1 | 8/2001 | Gordon, II et al. | 345/107 |
| 6,300,932 | B1 | 10/2001 | Albert | 345/107 |
| 6,301,038 | B1 | 10/2001 | Fitzmaurice et al. | 359/265 |
| 6,312,304 | B1 | 11/2001 | Duthaler et al. | 445/24 |
| 6,312,971 | B1 | 11/2001 | Amundson et al. | 438/99 |
| 6,323,989 | B1 | 11/2001 | Jacobson et al. | 359/296 |
| 6,327,072 | B1 | 12/2001 | Comiskey et al. | 359/296 |
| 6,330,054 | B1 | 12/2001 | Ikami | 355/400 |
| 6,337,761 | B1 | 1/2002 | Rogers et al. | 359/296 |
| 6,376,828 | B1 | 4/2002 | Comiskey | 250/216 |
| 6,377,387 | B1 | 4/2002 | Duthaler et al. | 359/296 |
| 6,392,785 | B1 | 5/2002 | Albert et al. | 359/296 |
| 6,392,786 | B1 | 5/2002 | Albert | 359/296 |
| 6,400,492 | B1 | 6/2002 | Morita et al. | 359/296 |
| 6,413,790 | B1 | 7/2002 | Duthaler et al. | 438/21 |
| 6,422,687 | B1 | 7/2002 | Jacobson | 347/55 |
| 6,445,374 | B2 | 9/2002 | Albert et al. | 345/107 |
| 6,445,489 | B1 | 9/2002 | Jacobson et al. | 359/296 |
| 6,459,418 | B1 | 10/2002 | Comiskey et al. | 345/107 |
| 6,473,072 | B1 | 10/2002 | Comiskey et al. | 345/173 |
| 6,480,182 | B2 | 11/2002 | Turner et al. | 345/107 |
| 6,498,114 | B1 | 12/2002 | Amundson et al. | 438/780 |
| 6,504,524 | B1 | 1/2003 | Gates et al. | 345/107 |
| 6,506,438 | B2 | 1/2003 | Duthaler et al. | 427/58 |
| 6,512,354 | B2 | 1/2003 | Jacobson et al. | 324/71.1 |
| 6,515,649 | B1 | 2/2003 | Albert et al. | 345/107 |
| 6,515,790 | B2 | 2/2003 | Miyamoto et al. | 359/296 |
| 6,517,995 | B1* | 2/2003 | Jacobson et al. | 430/320 |
| 6,518,949 | B2 | 2/2003 | Drzaic | 345/107 |
| 6,521,489 | B2 | 2/2003 | Duthaler et al. | 438/149 |
| 6,531,997 | B1 | 3/2003 | Gates et al. | 345/107 |
| 6,535,197 | B1 | 3/2003 | Comiskey et al. | 345/107 |
| 6,538,801 | B2 | 3/2003 | Jacobson et al. | 359/296 |
| 6,545,291 | B1 | 4/2003 | Amundson et al. | 257/40 |
| 6,580,545 | B2 | 6/2003 | Morrison et al. | 359/265 |
| 6,639,578 | B1 | 10/2003 | Comiskey et al. | 345/107 |
| 6,652,075 | B2 | 11/2003 | Jacobson | 347/55 |
| 6,657,772 | B2 | 12/2003 | Loxley | 359/296 |
| 6,664,944 | B1 | 12/2003 | Albert et al. | 345/107 |
| D485,294 | S | 1/2004 | Albert | D18/26 |
| 6,672,921 | B1 | 1/2004 | Liang et al. | 445/24 |
| 6,680,725 | B1 | 1/2004 | Jacobson | 345/107 |
| 6,683,333 | B2 | 1/2004 | Kazlas et al. | 257/197 |
| 6,693,620 | B1 | 2/2004 | Herb et al. | 345/107 |
| 6,704,133 | B2 | 3/2004 | Gates et al. | 359/296 |
| 6,710,540 | B1 | 3/2004 | Albert et al. | 313/498 |
| 6,721,083 | B2 | 4/2004 | Jacobson et al. | 359/296 |
| 6,724,519 | B1 | 4/2004 | Comiskey et al. | 359/296 |
| 6,727,881 | B1 | 4/2004 | Albert et al. | 345/107 |
| 6,738,050 | B2 | 5/2004 | Comiskey et al. | 345/173 |
| 6,750,473 | B2 | 6/2004 | Amundson et al. | 257/40 |
| 6,753,999 | B2 | 6/2004 | Zehner et al. | 359/296 |
| 6,816,147 | B2 | 11/2004 | Albert | 345/107 |
| 6,819,471 | B2 | 11/2004 | Amundson et al. | 359/296 |
| 6,822,782 | B2 | 11/2004 | Honeyman et al. | 359/296 |
| 6,825,068 | B2 | 11/2004 | Denis et al. | 438/149 |
| 6,825,829 | B1 | 11/2004 | Albert et al. | 345/107 |
| 6,825,970 | B2 | 11/2004 | Goenaga et al. | 359/296 |
| 6,831,769 | B2* | 12/2004 | Holman et al. | 359/296 |
| 6,839,158 | B2 | 1/2005 | Albert et al. | 359/296 |
| 6,842,167 | B2 | 1/2005 | Albert et al. | 345/107 |
| 6,842,279 | B2 | 1/2005 | Amundson | 359/296 |
| 6,842,657 | B1 | 1/2005 | Drzaic et al. | 700/120 |
| 2001/0055000 | A1 | 12/2001 | Kanae et al. | 359/296 |
| 2002/0060321 | A1 | 5/2002 | Kazlas et al. | 257/66 |
| 2002/0063661 | A1 | 5/2002 | Comiskey et al. | 345/55 |
| 2002/0075556 | A1 | 6/2002 | Liang et al. | 359/296 |
| 2002/0090980 | A1 | 7/2002 | Wilcox et al. | 455/566 |
| 2002/0106874 | A1* | 8/2002 | Iwane et al. | 438/487 |
| 2002/0113770 | A1 | 8/2002 | Jacobson et al. | 345/107 |
| 2002/0130832 | A1 | 9/2002 | Baucom et al. | 345/107 |
| 2002/0131147 | A1 | 9/2002 | Paolini, Jr. et al. | 359/296 |
| 2002/0171910 | A1 | 11/2002 | Pullen et al. | 359/296 |
| 2002/0180687 | A1 | 12/2002 | Webber | 345/107 |
| 2002/0180688 | A1 | 12/2002 | Drzaic et al. | 345/107 |
| 2003/0011560 | A1 | 1/2003 | Albert et al. | 345/107 |
| 2003/0020844 | A1 | 1/2003 | Albert et al. | 349/33 |
| 2003/0025855 | A1* | 2/2003 | Holman et al. | 349/86 |
| 2003/0102858 | A1 | 6/2003 | Jacobson et al. | 324/158.1 |

| | | | |
|---|---|---|---|
| 2003/0132908 A1 | 7/2003 | Herb et al. | 345/107 |
| 2003/0137521 A1 | 7/2003 | Zehner et al. | 345/589 |
| 2003/0151702 A1 | 8/2003 | Morrison et al. | 349/25 |
| 2003/0214695 A1 | 11/2003 | Abramson et al. | 359/265 |
| 2003/0214697 A1 | 11/2003 | Duthaler et al. | 359/296 |
| 2003/0222315 A1 | 12/2003 | Amundson et al. | 257/368 |
| 2004/0012839 A1 | 1/2004 | Cao et al. | 359/296 |
| 2004/0014265 A1* | 1/2004 | Kazlas et al. | 438/200 |
| 2004/0027327 A1* | 2/2004 | LeCain et al. | 345/107 |
| 2004/0075634 A1 | 4/2004 | Gates | 345/99 |
| 2004/0094422 A1 | 5/2004 | Pullen et al. | 204/600 |
| 2004/0105036 A1 | 6/2004 | Danner et al. | 348/748 |
| 2004/0112750 A1 | 6/2004 | Jacobson et al. | 204/601 |
| 2004/0119681 A1 | 6/2004 | Albert et al. | 345/107 |
| 2004/0136048 A1 | 7/2004 | Arango et al. | 359/296 |
| 2004/0155857 A1 | 8/2004 | Duthaler et al. | 345/107 |
| 2004/0180476 A1 | 9/2004 | Kazlas et al. | 438/146 |
| 2004/0190114 A1 | 9/2004 | Jacobson et al. | 359/296 |
| 2004/0196215 A1 | 10/2004 | Duthaler et al. | 345/30 |
| 2004/0226820 A1 | 11/2004 | Webber et al. | 204/271 |
| 2004/0233509 A1 | 11/2004 | Zhang et al. | 359/296 |
| 2004/0239614 A1 | 12/2004 | Amundson et al. | 345/107 |
| 2004/0252360 A1* | 12/2004 | Webber et al. | 359/296 |
| 2004/0257635 A1 | 12/2004 | Paolini, Jr. et al. | 359/296 |
| 2004/0263947 A1 | 12/2004 | Drzaic et al. | 359/296 |
| 2005/0000813 A1 | 1/2005 | Pullen et al. | 204/601 |
| 2005/0001812 A1 | 1/2005 | Amundson et al. | 345/107 |
| 2005/0007336 A1 | 1/2005 | Albert et al. | 345/107 |
| 2005/0007653 A1 | 1/2005 | Honeyman et al. | 359/321 |
| 2005/0012980 A1 | 1/2005 | Wilcox et al. | 359/296 |
| 2005/0017944 A1 | 1/2005 | Albert | 345/107 |
| 2005/0018273 A1 | 1/2005 | Honeyman et al. | 359/296 |
| 2005/0024353 A1 | 2/2005 | Amundson et al. | 345/204 |
| 2005/0035941 A1 | 2/2005 | Albert et al. | 345/107 |
| 2005/0041004 A1 | 2/2005 | Gates et al. | 345/87 |

FOREIGN PATENT DOCUMENTS

| | | | |
|---|---|---|---|
| EP | 1145072 B1 | | 5/2003 |
| JP | 62-269124 A | | 11/1987 |
| JP | 64-86116 | | 3/1989 |
| JP | 01-267525 A | | 10/1989 |
| JP | 02-284125 A | | 11/1990 |
| JP | 03-168613 | | 7/1991 |
| JP | 08-278491 | | 10/1996 |
| JP | 10-149118 A | | 6/1998 |
| JP | 2002-098945 | * | 5/2002 |
| WO | WO-82/02961 A1 | | 9/1982 |
| WO | WO 97/40419 | | 10/1997 |
| WO | WO-00/05704 A1 | | 2/2000 |
| WO | WO-00/36560 A1 | | 6/2000 |
| WO | WO-00/38000 A1 | | 6/2000 |
| WO | WO-00/67110 A1 | | 11/2000 |
| WO | WO-00/67327 A1 | | 11/2000 |
| WO | WO-01/07961 A1 | | 2/2001 |
| WO | WO-01/27690 A2 | | 4/2001 |
| WO | WO-01/92359 A1 | | 12/2001 |
| WO | WO-03/107315 A2 | | 12/2003 |

OTHER PUBLICATIONS

Bach, U. et al., Nanomaterials-Based Electrochromics for Paper-Quality Displays, Advanced Materials, Jun. 5, 2002, p. 845, vol. 14, No. 11.

Chen, Y., et al., A Conformable Electronic Ink Display using a Foil-Based a-Si TFT Array, SID 01 Digest, 2001, p. 157.

Comiskey B., et al., An electrophoretic ink for all-printed reflective electronic displays, Nature, Jul. 16, 1998, p. 253, vol. 394.

Comiskey, B., et al., Electrophoretic Ink: A Printable Display Material, SID 97 Digest, 1997, p. 75.

Croucher, M.D., et al., Electrophoretic Display: Materials as Related to Performance, Photographic Science and Engineering, Mar. 1981, pp. 80-86, vol. 25, No. 2.

Dalisa, A.L., Electrophoretic Display Technology, IEEE Transactions on Electron Devices, Jul. 1977, pp. 827-834, vol. Ed.24, No. 7.

Drzaic, P., et al., A Printed and Rollable Bistable Electronic Display, SID 98 Digest, 1998, p. 1131.

Duthaler, G. et al., Active-Matrix Color Displays Using Electrophoretic Ink and Color Filters, SID 02 Digest, 2002, p. 1374.

Gutcho, M.H., Microcapsules and Microencapsulation Techniques, 1976, Publisher: Noyes Data Corp., Published in: Park Ridge, NJ.

Jacobson, J., et al., The Last Book, IBM Systems Journal, 1997, p. 457, vol. 36, No. 3.

Jo, G-R., et al., Toner Display Based on Particle Movements, Chem. Mater., Jan. 22, 2002, pp. 664-669, vol. 14.

Kazlas, P., et al., VGA Microencapsulated Electrophoretic Active Matrix Display for Information Appliances, SID 01 Digest, 2001, p. 152.

Kitamura, T., et al., Electrical toner movement for electronic paper-like display (Paper HCS1-1), Asia Display/IDW '01, 2001, p. 1517.

O–Regan et al., A Low Cost, High-efficiency Solar Cell Based on Dye-sensitized colloidal TiO2 Films, Nature, Oct. 24, 1991, p. 737, vol. 253.

Ota, I. et al., Developments in Electrophoretic Displays, Proceedings of the S.I.D., 1977, pp. 243-254, vol. 18.

Pitt, M.G., et al., Power Consumption of Microencapsulated Electrophoretic Displays for Smart Handheld Applications, SID 02 Digest, 2002, p. 1378.

Shiwa, S., et al., Electrophoretic Display Method Using Ionographic Technology, SID 88 Digest, 1988, pp. 61-62.

Webber, Richard, Image Stability in Active-Matrix Microencapsulated Electrophoretic Displays, SID 02 Digest, 2002, p. 126.

Wood, Dan, An Electrochromic Renaissance?, Information Display, Mar. 2002, pp. 24-26.

Yamaguchi, Y., et al., Toner display using insulative particles charged triboelectrically, Asia Display/IDW '01, 2001, p. 1729.

* cited by examiner

ELECTRO-OPTIC DISPLAYS

CROSS REFERENCE TO RELATED APPLICATIONS

This application claims priority from Provisional Application Ser. No. 60/319,516, filed Sep. 3, 2002.

This application is related to copending application Ser. No. 10/143,046 filed May 10, 2002 (Publication No. 2003/0011560, now U.S. Pat. No. 7,256,766), and entitled "Electrophoretic display comprising optical biasing element", which is a continuation-in-part of application Ser. No. 09/140,862, filed Aug. 27, 1998 (now U.S. Pat. No. 7,167,155). This application is also related to copending application Ser. No. 10/145,861 (Publication No. 2002/0180688, now U.S. Pat. No. 6,864,875), which is a continuation of application Ser. No. 09/436,303, filed Nov. 8, 1999 (now abandoned), which is turn is a divisional of copending application Ser. No. 09/289,507, filed Apr. 9, 1999 (now U.S. Pat. No. 7,075,502), which claims priority from Provisional Application Ser. No. 60/081,362, filed Apr. 10, 1998. This application is also related to copending application Ser. No. 10/249,957, filed May 22, 2003 (now U.S. Pat. No. 6,982,178), which claims priority from Application Ser. No. 60/319,300, filed Jun. 10, 2002 and Application Ser. No. 60/320,186, filed May 12, 2003. The entire contents of all the aforementioned applications, and of all patents and applications referred to below, are herein incorporated by reference.

BACKGROUND OF INVENTION

This invention relates to electro-optic displays. More specifically, this invention relates to components for use in electro-optic displays, novel color filters for use in such displays and methods for preparing such filters. This invention also relates to novel methods for controlling the color of electrophoretic displays.

Electro-optic displays comprise a layer of electro-optic material, a term which is used herein in its conventional meaning in the art to refer to a material having first and second display states differing in at least one optical property, the material being changed from its first to its second display state by application of an electric field to the material. The optical property is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range.

Most aspects of the present invention are intended for use with electro-optic displays containing an electro-optic medium which is a solid (such displays may hereinafter for convenience be referred to as "solid electro-optic displays"), in the sense that the electro-optic medium has solid external surfaces, although the medium may, and often does, have internal liquid- or gas-filled spaces, and to methods for assembling displays using such an electro-optic medium. Thus, the term "solid electro-optic displays" includes encapsulated electrophoretic displays, rotating bichromal member displays, electrochromic displays, microcell displays, and other types of displays as discussed below.

One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface.

Another type of electro-optic medium is an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in copending application Ser. No. 10/249,128, filed Mar. 18, 2003.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; and 6,580,545; and U.S. patent applications Publication Nos. 2002/0019081; 2002/0021270; 2002/0053900; 2002/0060321; 2002/0063661; 2002/0063677; 2002/0090980; 2002/0106847; 2002/0113770; 2002/0130832; 2002/0131147; 2002/0145792; 2002/0171910; 2002/0180687; 2002/0180688; 2002/0185378; 2003/0011560; 2003/0011867; 2003/0011868; 2003/0020844; 2003/0025855; 2003/0034949; 2003/0038755; 2003/0053189; 2003/0076573; 2003/0096113; 2003/0102858; 2003/0132908; 2003/0137521; and 2003/0137717; and International Applications Publication Nos. WO 99/67678; WO 00/05704; WO 00/38000; WO 00/38001; WO 00/36560; WO 00/67110; WO 00/67327; WO 01/07961; and WO 01/08241.

Many of the aforementioned patents and applications recognize that the walls surrounding the discrete microcapsules in an encapsulated electrophoretic medium could be replaced by a continuous phase, thus producing a so-called polymer-dispersed electrophoretic display in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: premetered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; inkjet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Applications Publication No. WO 02/01281, and published U.S. application No. 2002-0075556, both assigned to Sipix Imaging, Inc.

Most types of electro-optic media have only a limited number of optical states, for example a dark (black) state, a light (white) state and, in some cases, one or more intermediate gray states. Accordingly, to construct a full color display using such media, it is common practice to place an electro-optic medium adjacent a color filter having, for example, multiple red, green and blue areas, and to provide a driving arrangement for the electro-optic medium which permits independent control of the medium adjacent each red, green or blue area. Certain applications of color filters with electrophoretic displays are described in the aforementioned application Ser. No. 09/289,507. The aforementioned 2003/0011560 describes ways for modifying the optical properties of electrophoretic displays by incorporating an optical biasing element in any one of several components of the display.

The present invention seeks to provide improvements in color filters used in electro-optic displays, and in ways of generating color in such displays.

SUMMARY OF INVENTION

In one aspect, the present invention provides an electrophoretic medium comprising a plurality of electrically charged particles dispersed in a suspending fluid, the particles comprising at least two types of particles having substantially the same electrophoretic mobility but differing colors. This aspect of the invention may hereinafter be referred to as the "custom color" electrophoretic medium.

In this custom color electrophoretic medium, the electrically charged particles are desirably formed from an inorganic pigment, which may be coated with a coating selected from silica and silica alumina. The electrically charged particles may be coated with a polymer. The electrically charged particles and the suspending fluid may be held within at least one capsule.

This invention also provides a process for forming a custom color electrophoretic medium of the invention. This process comprises:

mixing at least two pigments having differing colors to form a mixed pigment;

subjecting the mixed pigment to at least one surface treatment; and dispersing the surface-treated mixed pigment in a suspending fluid to form at least two types of particles having substantially the same electrophoretic mobility but differing colors.

In this process, the surface treatment may comprise treating the mixed pigment with a silane coupling agent to provide sites at which a polymer can be attached to the mixed pigment, and thereafter treating the silylated mixed pigment with at least one monomer and oligomer under conditions effective to cause polymer for form of the mixed pigment surface.

In another aspect, the present invention provides an electro-optic display element comprising:

an electro-optic display medium;

an optical biasing element arranged to modify an optical characteristic of the electro-optic display element; and an addressing electrode to address the electro-optic display medium, wherein the color of the optical biasing element varies in different portions of the electro-optic display element, so that the optical biasing element forms a color filter.

This aspect of the invention may hereinafter be referred to as the "internal color filter" display element.

In such an internal color filter display element, the electro-optic display medium may be an electrophoretic medium comprising a suspending fluid, a plurality of electrically charged particles suspended in the suspending fluid and capable of moving therethrough on application of an electric field to the suspending fluid, and at least one capsule having a capsule wall surrounding the suspending fluid and the electrically charged particles, the display element optionally comprising a binder surrounding the capsules and/or a lamination adhesive disposed adjacent the electrophoretic medium and/or a front electrode disposed between the electrophoretic medium and a viewing surface of the display, and the optical biasing element may be disposed in at least one of the capsule wall, the binder, the lamination adhesive and the front electrode.

Another, related aspect of the invention provides an electro-optic display comprising a layer of a solid electro-optic medium, at least one electrode arranged adjacent the layer of electro-optic medium so as to apply an electric field thereto, and a color filter array disposed between the electro-optic medium and the electrode, the resistance of the color filter array being not substantially greater than that of the layer of electro-optic medium.

In such an electro-optic display, the color filter array will typically have a volume resistivity not greater than about $10^{10}$ ohm cm.

In another aspect, this invention provides an electrophoretic medium comprising a plurality of capsules, each capsule comprising a suspending fluid, a plurality of electrically charged particles suspended in the suspending fluid and capable of moving therethrough on application of an electric field to the suspending fluid, and a capsule wall surrounding the suspending fluid and the electrically charged particles, the medium further comprising a color filter array having a plurality of non-rectangular pixels. In preferred forms of this electrophoretic display, the pixels of the color filter array are hexagonal, square, or triangular, preferably equilateral triangular.

In another aspect, this invention provides an article of manufacture comprising:

a layer of a solid electro-optic medium having first and second surfaces on opposed sides thereof;

a first adhesive layer on the first surface of the layer of solid electro-optic medium;

a (first) release sheet disposed on the opposed side of the first adhesive layer from the layer of solid electro-optic medium; and a second adhesive layer on the second surface of the layer of solid electro-optic medium.

A preferred form of this article of manufacture further comprises a second release sheet disposed on the opposed side of the second adhesive layer from the layer of solid electro-optic medium.

In this article of manufacture, the electro-optic medium may be an electrophoretic medium comprising a plurality of capsules, each capsule comprising a suspending fluid, a plurality of electrically charged particles suspended in the suspending fluid and capable of moving therethrough on application of an electric field to the suspending fluid, and a capsule wall surrounding the suspending fluid and the electrically charged particles. Also, the first and second adhesive layers may extend beyond the periphery of the layer of electro-optic medium; as described in more detail below, this provides a convenient way for form an edge seal for the display.

In another aspect, this invention provides an article of manufacture comprising:

a layer of a solid electro-optic medium having first and second surfaces on opposed sides thereof;

a first release sheet covering the first surface of the layer of solid electro-optic medium; and a second release sheet covering the second surface of the layer of solid electro-optic medium.

The foregoing articles of manufacture may hereinafter be referred to as the "double release film" of the invention.

This invention also provides a process for forming an electro-optic display using the double release film of the invention. This process comprises:

providing an article of manufacture comprising a layer of a solid electro-optic medium having first and second surfaces on opposed sides thereof, a first adhesive layer on the first surface of the layer of solid electro-optic medium, a release sheet disposed on the opposed side of the first adhesive layer from the layer of solid electro-optic medium; and a second adhesive layer on the second surface of the layer of solid electro-optic medium;

laminating the article to a front substrate via the second adhesive layer, thereby forming a front subassembly;

removing the release sheet from the front subassembly; and laminating the front subassembly via the first adhesive layer to a backplane comprising at least one electrode, thereby forming the electro-optic display.

In this process, the front substrate may comprise an electrode and/or a color filter array. The article of manufacture may comprise a second release sheet covering the second adhesive layer, and the process comprise removing the second release sheet from the second adhesive layer prior to laminating the article to the front substrate.

In another aspect, this invention provides a process for forming a color filter array, the process comprising:

imaging a photosensitive film to form a color filter array pattern thereon; and thereafter depositing a conductive layer on to the photosensitive film.

In another aspect, this invention provides a process for forming an electrophoretic display, the process comprising:

providing a color filter array; providing an electrophoretic medium comprising a plurality of capsules, each capsule comprising a suspending fluid, a plurality of electrically charged particles suspended in the suspending fluid and capable of moving therethrough on application of an electric field to the suspending fluid, and a capsule wall surrounding the suspending fluid and the electrically charged particles;

depositing the electrophoretic medium on to a color filter array to form a coated color filter array; and thereafter laminating the coated color filter array to a backplane comprising at least one pixel electrode.

In this process, the surface of the color filter array may be surface treated prior to the deposition to produce regions of varying surface energy on the surface.

In another aspect, this invention provides a process for depositing an electrophoretic medium on an electrode, the process comprising:

providing an electrode; providing an electrophoretic medium comprising a plurality of capsules, each capsule comprising a suspending fluid, a plurality of electrically charged particles suspended in the suspending fluid and capable of moving therethrough on application of an electric field to the suspending fluid, and a capsule wall surrounding the suspending fluid and the electrically charged particles;

surface treating the electrode to produce regions of varying surface energy thereon; and depositing the electrophoretic medium on the surface-treated electrode.

Finally, this invention provides a process for forming an electrophoretic display, the process comprising:

providing a front substrate;

providing a backplane;

providing an electrophoretic medium comprising a plurality of capsules, each capsule comprising a suspending fluid, a plurality of electrically charged particles suspended in the suspending fluid and capable of moving therethrough on application of an electric field to the suspending fluid, and a capsule wall surrounding the suspending fluid and the electrically charged particles;

surface treating a surface of the front substrate to promote wetting thereof by the capsules;

surface treating a surface of the backplane to promote dewetting thereof by the capsules;

assembling the front substrate and the backplane together with the treated surfaces thereof facing each other, and with a gap between the treated surfaces; and introducing the electrophoretic medium into the gap, whereby the capsules of the electrophoretic medium pack against the treated surface of the front substrate.

DETAILED DESCRIPTION

The present invention provides several different improvements in color filters and other aspects of electro-optic displays, and in ways of generating color in such displays. These various improvements can be used alone or in various combinations (for example, a single display might use a color filter array having non-rectangular pixels produced by the imaging process of the invention. For convenience, the various aspects of the present invention will hereinafter be described separately, but it must always be remembered that multiple aspects of the invention may be used in a single electro-optic display or component thereof.

Part A—Custom Colors in Electrophoretic Displays

As discussed in some of the aforementioned E Ink and MIT patents and published applications, in an electrophoretic display one alternative to the use of color filters is to use multiple types of capsules capable of displaying differing colors. For example, the aforementioned 2002/0180688 shows, in FIG. 3I, one pixel of an encapsulated electrophoretic display, this pixel comprising three sub-pixels, each of which comprises a single capsule capable of displaying three colors. Although these are not the colors actually described with reference to this FIG. 3I, it will readily be understood by those skilled in the technology of electro-optic displays that a full color RGB display could be produced using capsules capable of white/black/red, white/black/green and white/black/blue optical states.

One major commercial application of electro-optic displays is in advertising, and in advertising materials it is desirable to be able to customize the colors displayed for particular customers. For example, many major corporations have established corporate practices which require that certain color logos and/or trademarks be presented in an absolutely consistent manner, with the proper colors of each portion of the relevant logo or trademark being specified in terms of the Pantone ("PANTONE" is a Registered Trademark) or a similar color system. Thus, such corporations may require that (say) the blue state of an RGB electrophoretic display be customized to render a blue portion of their corporate logo accurately, even at the cost of some reduction in the color gamut of the display (the range of colors capable of being displayed by the display).

At first glance, such customization of colors in an electrophoretic display appears to pose formidable obstacles. Determining the type of particles to use in an electrophoretic display is a complex process which needs to take account not only of the color of the particle but also, inter alia, its ability to maintain a consistent electrical charge (and thus a consistent electrophoretic mobility), its tendency to aggregate, its color fastness against light and its compatibility with other components of the electrophoretic medium, for example the suspending fluid in which the electrophoretic particles are suspended and the capsule wall. Carrying out all the necessary tests is a time-consuming and expensive process, which cannot economically be carried out every time a customer requires a custom color in a display. Furthermore, in practice it is found that organic pigments tend not to be useful in electrophoretic displays because they degrade too rapidly, so that commercial displays use metal oxide or similar inorganic pigments, and it is far less easily to vary the exact color of such inorganic pigments than it is organic pigments.

However, it has now been realized that, in an electrophoretic display, all of the electrophoretic particles of a particular type used to produce a particular color (for example, the blue particles shown in the aforementioned FIG. 3I) need not be of the same color, provided that all of the same type of particles have similar electrophoretic mobilities so that they do not segregate during operation of the display. The individual electrophoretic particles, which typically have diameters of the order of 1 μm, are far too small to be visible to an observer of the display. Accordingly, provided that the particles do not segregate during operation of the display, an observer sees only the average color of all the particles of a particular type. For example, it is well known to those skilled in color mixing that the apparent degree of saturation of many blues can be improved by adding a small proportion of magenta to the blue. Accordingly, if for example a particular customer required the blue state of the aforementioned white/black/blue sub-pixels to have a degree of saturation greater than could be achieved by the available blue particles, the sub-pixel could contain a mixture of a major proportion of blue particles and a minor proportion (say about 10 percent) of magenta particles.

This ability to use mixtures of differently colored particles as a single type of electrophoretic particles greatly simplifies the problem of customizing colors in an electrophoretic display. If one prepares a set of three or four electrophoretic particles having differing colors (say RGB, RGBK, CMY or CMYK) but substantially the same electrophoretic mobility, pixels having any desired color within the gamut available from the set can be prepared by simply mixing and encapsulating appropriate amounts of the various particles to form the desired color.

Thus, as already mentioned in one aspect the present invention provides an electrophoretic medium comprising a plurality of electrically charged particles dispersed in a suspending fluid, the particles comprising at least two types of particles having substantially the same electrophoretic mobility but differing colors.

Although this aspect of the present invention is described herein primarily with regard to full color displays, it is of course not confined to such displays. For example, the present invention may be useful in simple flashing displays in which a layer of an electrophoretic medium is confined between two electrodes, which apply drive pulses of alternating polarities to the electrodes, and in which the layer of electrophoretic medium comprises different types of capsules deposited in different areas, each type of capsule having (say) a black optical state and a second optical state of another color. Such a display may be used to flash a corporate logo or other symbol.

Technology is available which substantially reduces the difficulties of ensuring that electrophoretic particles formed from different pigments have substantially the same electrophoretic mobility. The aforementioned 2002/0185378 and the corresponding WO 02/093246 describe a process for forming electrophoretic particles in which a pigment is first coated with a layer of silica (other oxides may also be used) and then a polymer is formed chemically bonded to the silica;

the polymer may contain electrically charged groups to enhance the electrophoretic mobility of the particle. In such silica/polymer coated particles, the surface charge which is responsible for the electrophoretic mobility of the particle is essentially confined to the silica layer and/or the polymer, so that the nature of the underlying pigment is essentially irrelevant to the electrophoretic mobility of the particle. Accordingly, provided that the particle size of the pigment is controlled, a variety of pigments can be coated in this manner to produce electrophoretic particles having substantially the same electrophoretic mobility.

Furthermore, if the scale of production needed warrants it, mixing of the different pigments required to produce a display with a custom color can be effected at an early stage in the multi-stage process required to produce the display, with the resultant mixture of pigments thereafter carried as a single component through the subsequent stages of the process. By way of example, consider the preferred process for producing electrophoretic particles described in aforementioned 2002/0185378 and the corresponding WO 02/093246. This process comprises (a) forming a silica or silica/alumina shell around a raw pigment; (b) treating the silica-coated pigment with a silane coupling agent to provide sites at which a polymer can be attached to the pigment; and (c) treating the silylated pigment would at least one monomer or oligomer under conditions effective to cause polymer to form on the pigment surface (certain preferred forms of the process require multiple polymerization steps and/or further processing to modify the chemical characteristics of the polymer originally formed). In such a process, the blending of two or more pigments to provide a custom color in the final display could be effected at various stages, as follows:

1. Blending of Raw Pigments:

Raw untreated pigments may be blended to obtain the desired color before the first modification of the surface. The blended pigment mixture is then coated with silica or silica/alumina followed by the silane treatment and polymer formation steps.

At first glance, this might appear to be the most preferred method to assure that the blended pigments have been treated in the same manner under identical conditions thus leading to blended pigments with identical surface chemistries. On the other hand, it may be difficult to judge the color in the final display from that obtained by raw pigment blending because of color alterations due to the inorganic coating, pigment wetting when in the suspending fluid (silica is used to coat pigments in paint applications to prevent this wetting effect, but wetting must still be considered) and alterations in the pigment color when placed behind the capsule wall, conductive, binder, adhesive, filter layer and other layers conventionally used in electrophoretic displays, as described in the aforementioned E Ink and MIT patents and applications. These color alterations may require repeated iterations of the blending process and the production of displays from the blended pigment, with considerable increase in expense and development time for custom color displays.

2. Blending of Pigments after Formation of Inorganic Shell

In this route, raw pigments are first modified independently with a silica or silica/alumina shell then blended to achieve the desired color, and thereafter the blended pigment is subjected to silane treatment and polymer formation.

3. Blending of Pigments after Formation of Inorganic Shell and Silane Treatment

In this route, raw pigments are first modified independently with a silica or silica/alumina shell and silane treatment. The pigments are then blended to obtain the desired color and the blended pigments subjected to polymer formation.

4. Blending of Pigments Formation of Inorganic Shell, Silane Treatment and Polymer Formation In this route, raw pigments are first modified independently with a silica or silica/alumina shell, followed by silane treatment and polymer formation. The pigments are then blended to achieve the desired color.

This route ensures that the surface modification of the pigments does not alter the color of the pigments because the pigments are blended after all chemical modifications have been completed. Nevertheless the color of the blended pigment may still change after incorporation into an internal phase and placement behind a capsule wall, binder, adhesive, and other layers as discussed above. However, this route does may give rise to problems in ensuring that the pigments in the final blend have been treated in the same manner under identical conditions thus leading to identical surface chemistries such as the thickness/coverage of the silica or silica/alumina layer, coverage/quality/density of the silane deposition and thickness/molecular weight/density of the polymer.

Part B—"Internal" Color Filters

Conventional color filter arrays (CFA's) for use in electro-optic displays comprise a layer of material colored in an appropriate manner and disposed adjacent the viewing surface of the display, "outside" the front electrode, i.e., between the front electrode and the viewer. Such a conventional CFA is necessarily separated from the electro-optic layer by at least the thickness of the front electrode and possibly other layers, for example a substrate on which the front electrode is mounted and/or a binder in which electrophoretic capsules are held and/or the polymeric matrix in a rotating bichromal member display. This separation between the CFA and the electro-optic layer gives rise to parallax problems, and these problems are exacerbated by the wide viewing angles of many electro-optic displays. Such parallax problems adversely affect the quality of an image on the display, especially when the display is viewed at a large angle to the perpendicular to the viewing surface thereof.

Another problem with conventional CFA's is aligning the CFA with the pixel electrodes used to drive the display; it will be appreciated that any misalignment between the CFA and the pixel electrodes will cause cross-talk between the various color channels of the image on the display. Alignment of CFA's with pixel electrodes is more difficult in many types of electro-optic displays than in liquid crystal displays, since in liquid crystal displays the CFA and the pixel electrodes can be aligned optically before the liquid crystal itself is introduced into the display, whereas in, for example, electrophoretic or rotating bichromal member displays, this approach is not possible since the normal method for manufacturing such displays is to deposit the electro-optic layer on to the CFA, and then to laminate the combined electro-optic layer/CFA to a backplane containing the pixel electrodes. Since an electrophoretic or rotating bichromal member electro-optic layer is essentially opaque, the pixel electrodes are not visible through the electro-optic layer during the lamination procedure, thus precluding optical alignment of the CFA with the pixel electrodes.

As already mentioned, the aforementioned 2003/0011560 describes ways for modifying the optical properties of electrophoretic displays by incorporating an optical biasing element in any one of several components of the display. It has now been realized that this optical biasing element can serve as a color filter for the display, provided that the optical biasing element has varying colors in different areas of the display to provide the necessary color filter elements.

The possible locations of such an optical biasing element/color filter will vary with the type of electro-optic display. For example, in an encapsulated electrophoretic display the color filter may be provided (a) in the walls of the capsules; (b) in the binder which surrounds the capsules; (c) in a lamination adhesive used to secure the electrophoretic medium to a substrate which forms the viewing surface of the display; or (d) in the front electrode of the display. (Note that since an electrophoretic medium is largely opaque, although the aforementioned 2003/0011560 describes optical biasing elements which lie "behind" the electrophoretic medium, i.e., on the opposed side of the medium from the viewing surface of the display, an optical biasing element serving as a color filter needs to be located either within the electrophoretic medium itself or between the electrophoretic medium and the viewing surface of the display.) In a microcell electrophoretic display, the color filter may be provided in the front sheet which seals the microcells, or in locations corresponding to (c) or (d) above. In a rotating bichromal member display, the optical biasing element/color filter may be provided in the polymeric matrix which surrounds the rotating members (this matrix essentially corresponding to the binder of an encapsulated electrophoretic display) or in locations (c) or (d) above.

Figure 1:
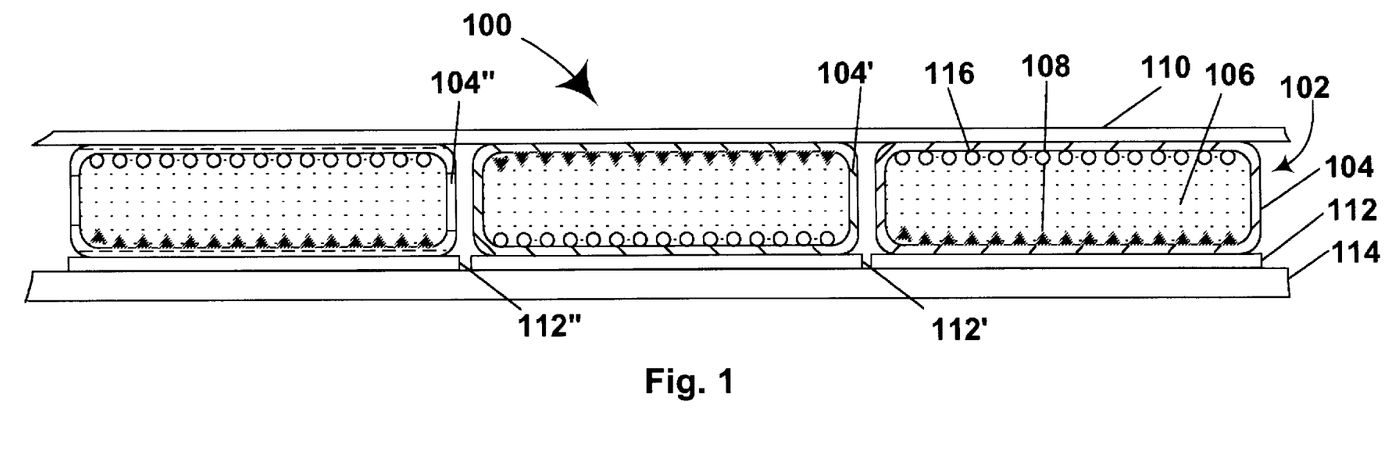
FIG. 1 of the accompanying drawings is a schematic cross-section through part of an encapsulated electrophoretic display in which a color filter array is provided in the capsule walls.

FIG. 1 of the accompanying drawings is a schematic cross-section through a preferred embodiment of the invention in which a color filter is provided in the capsule walls of an encapsulated electrophoretic display (generally designated 100). The display 100 comprises an encapsulated electrophoretic medium (generally designated 102) comprising a plurality of capsules 104, 104', 104", each of which contains a suspending liquid 106 and dispersed therein a plurality of positively charged black particles 108 and a plurality of negatively charged, white particles 116. (The triangular shape of the particles 108 and the circular shapes of the particles 116 are used purely by way of illustration to enable the particles to be distinguished easily in the accompanying drawings, and in no way correspond to the physical forms of the actual particles, which are typically substantially spherical.)

The display 100 further comprises a common, transparent front electrode 110, which forms a viewing surface through which an observer views the display 100, and a plurality of discrete rear electrodes 112, 112', 112", each of which defines one pixel of the display 100. For ease of illustration and comprehension, FIG. 1 shows only a single microcapsule forming the pixel defined by each rear electrode, although in practice a large number (20 or more) microcapsules are normally used for each pixel. The rear electrodes 112, 112', 112" are mounted upon a substrate 114.

The display 100 is an RGB display with the red, green and blue pixels arranged in cyclically repeating columns; it will be appreciated that although only one electrode is shown in each column in FIG. 1, in practice each column will contain a large number of electrodes, the potential on each of which is independently controlled by conventional active matrix drive circuitry (not shown). There is no external color filter; instead, an "internal" color filter is provided by dyeing the walls of the capsules 104, 104', 104". As indicated by the differences in shading in FIG. 1, the walls of capsule 104 are dyed to transmit red light, the walls of capsule 104' are dyed to transmit green light and the walls of capsule 104" are dyed to transmit blue light.

FIG. 1 shows the display 100 with the rear electrodes 112 and 112" held negative with respect to the common front electrode 110, but with the rear electrode 112' held positive with respect to the common front electrode 110. Accordingly, in capsules 104 and 104", the white particles 116 lie adjacent the viewing surface of the display, so that these pixels appear red and blue respectively. However, in capsule 104', the black particles 108 lie adjacent the viewing surface of the display, so that this pixel appears black.

It will be appreciated that displays of the type illustrated in FIG. 1 do not need to use a RGB color scheme but could, for example, use a CMY color scheme. Indeed, the latter may be preferred for a reflective electro-optic medium, such as the electrophoretic medium shown in FIG. 1, since a CMY color scheme typically absorbs less of the incoming light and may thus produce brighter colors.

Providing a CFA by dyeing the walls of microcapsules in an electrophoretic display in the manner described above with reference to FIG. 1 substantially eliminates the aforementioned parallax problem in that there is no longer any separation between the color filter array and the electro-optic layer of the display. Similar advantages as regards parallax problems are achieved by providing the CFA is the binder of an electrophoretic layer or in the polymeric matrix of a rotating bichromal member layer.

A wide variety of techniques may be used to produce displays with the internal CFA's of the present invention. These techniques may be divided into two main groups, "preformed" CFA's, in which the color is introduced into a display component before the component is formed into a display, and "in situ" CFA's, in which the CFA is formed in situ in the final display or in some sub-assembly thereof. An example of a preformed CFA is dyeing (or possibly treating with a pigment) capsules to form the red, green and blue transmitting capsule walls as described above with reference to FIG. 1, and then laying down the three types of microcapsules in stripes aligned with the pixel electrodes to form the display illustrated in FIG. 1. In general, however, in situ CFA's may be more easily adaptable for mass production of displays. It will be appreciated that, for example, in the display of FIG. 1, all the capsules are identical apart from the staining of the capsule walls, so that the display may be produced by coating a uniform layer of capsules and then dyeing the capsule walls, and optionally the surrounding binder, to produce the internal CFA. Note that although such a process may result in a single capsule extending across two adjacent electrodes, this has little or no effect on the properties of the display, since it has been found empirically that adjacent parts of the same capsule can have differing optical states when exposed to differing electrical fields.

In situ processes for the formation of CFA's may be divided into two main types. In the first type, an external coloring agent (for example, a dye or pigment, or a reagent which undergoes a color-forming reaction with a component of the display in which the CFA is to be formed) is applied imagewise to the display. For example, capsule walls may be stained by a pigment or dye which may be deposited using coating or printing techniques, such as registered slot coating of colored stripes, spraying through a mask, inkjet, offset, flexo-gravure or itaglio printing. In the second type, color is developed in the component of the display in which the CFA is to be formed using techniques based upon photographic processes. For example, chemical additives may be coated onto the capsule walls such that they resemble color film. Then, by projecting a image of the desired CFA on to the capsule coating, the capsules may be tinted to achieve proper coloration. In using the term "photographic processes", we do not intend to restrict the color-forming methods used to those based upon the photosensitivity of silver halides, and indeed the use of silver-based color formation will generally not be desirable since there are substantial practical difficulties in removing silver and silver halide from the CFA after the exposure. However, certain color-forming reactions are known which are strongly sensitive to wavelength, cf. U.S.

Pat. No. 4,602,263, and such color-forming reactions may be used to form the CFA's. For example, capsules could be prepared in which the walls contain mixtures of red-, green- and blue-dye forming compounds, these three compounds being sensitive to three different wavelengths of radiation (typically different infra-red wavelengths). After incorporation of the capsules into the display, the relevant areas of the display are exposed to radiation, preferably from lasers, of the different wavelengths to turn these areas red, green and blue, thus forming the CFA. Alternatively, the nanoparticle color-forming technology described in U.S. Pat. Nos. 6,323,989 and 6,538,801 and in copending application Ser. No. 10/065,617 (Publication No. 2003/0096113) may be used to produce the necessary color changes. For example, this patent and application disclose tethered nanoparticles which change color when the tether is broken by, for example, ultra-violet or other radiation. By including tethered nanoparticles into the capsule walls and then exposing the relevant areas of the display to the tether-breaking radiation, the color changes needed to form a CFA could be effected.

The in situ methods described above for formation of CFA's may be carried out on an electro-optic layer on a double-release film (see Section E below) rather than on an assembled display.

In situ formation of the CFA may be used to reduce or eliminate the CFA alignment problem discussed above by using the display itself to provide alignment marks needed for accurate alignment of the CFA with the pixel electrodes. For example, consider the aforementioned display containing capsules in which the walls contain mixtures of red-, green- and blue-dye forming compounds, these three compounds being sensitive to three different wavelengths of radiation. Once such a display has been assembled with an active matrix backplane, a portion of the backplane may be activated to form an image on the display. For example, the backplane might be activated such that the areas intended to be red and green in the final CFA are dark in color, whereas the areas intended to be blue are white. The resultant image can be used as alignment marks to expose the white areas of the display to the radiation needed to turn the capsules in these areas transmissive of blue light. Next, for example, the blue and intended green areas can be set dark, while the intended red areas are set white. It will be apparent that the entire CFA may be produced in this manner correctly aligned with the pixel electrodes.

In addition to the internal CFA's the displays of the present invention my include any one or more of antireflective coatings, microlens arrays, holographic filters, and brightness enhancement films. It may also be desirable to incorporate a barrier film onto the front of the display stack.

Part C—Color Filters with Non-Rectangular Pixels

Traditional CFA's used in liquid crystal displays are not optimally suited for use in encapsulated electrophoretic displays. An encapsulated electrophoretic medium tends to exhibit a slightly degraded optical state near the boundaries between capsules (i.e., at the capsule walls) compared to the optical state exhibited near the center of a capsule.

Figure 2A:
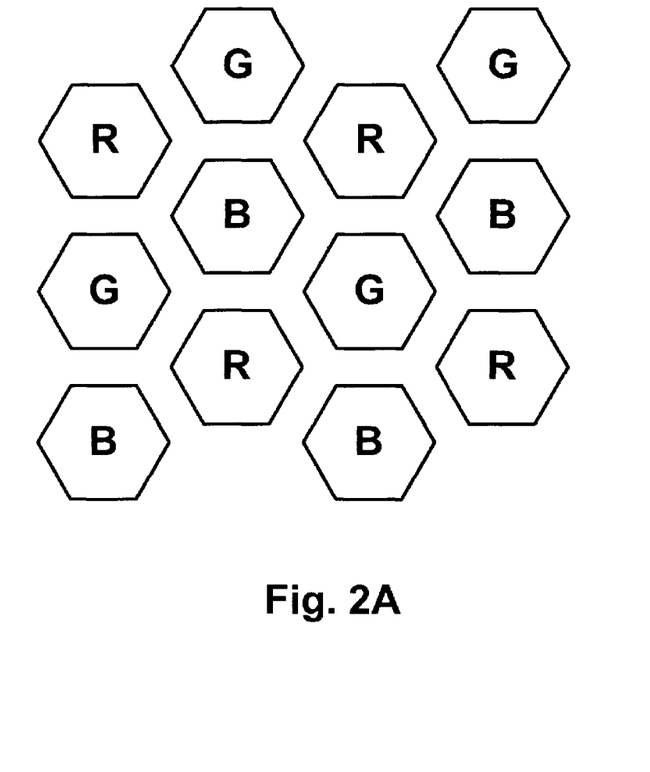
FIGS. 2A, 2B and 2C show three different arrangements of pixels in a color filter array of the present invention.
Figure 2B:
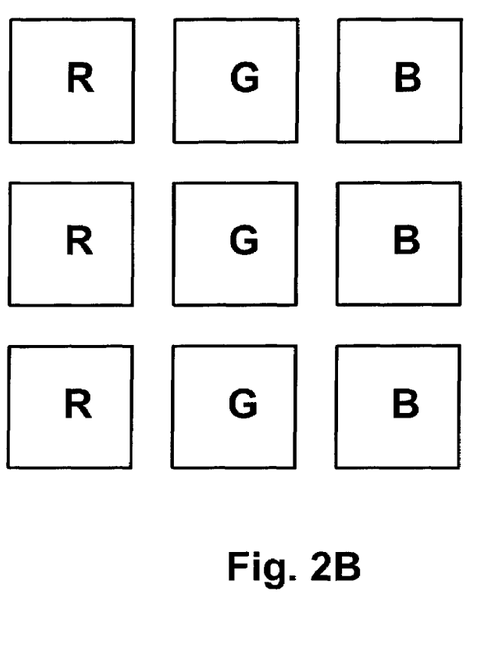
Figure 2C:
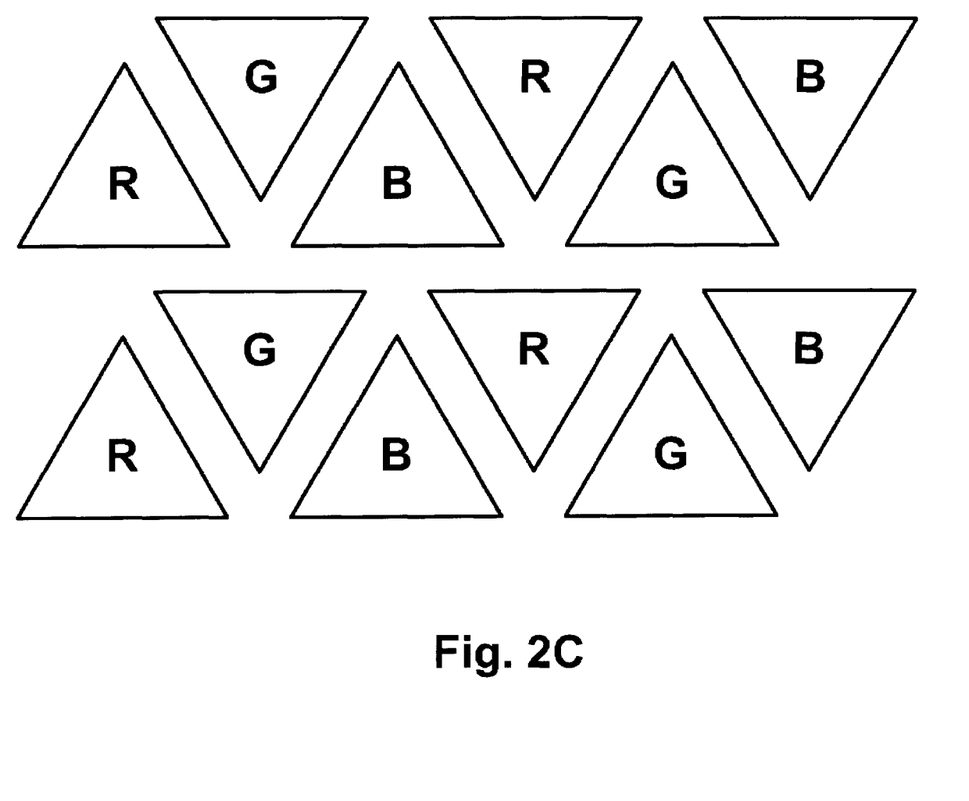

It has now been realized that these effects due to the capsule walls can be minimized by careful choice of the shapes of the pixels in the CFA; the pixel electrodes used to control the display must of course match the shapes of the CFA pixels. Designs which increase the likelihood that the capsule walls will lie in the gaps between adjacent pixels, as compared with the (elongate, non-square) rectangular pixels typically used in liquid crystal displays are preferred. The CFA pixels may have the form of hexagons (see FIG. 2A), squares (FIG. 2B) or triangles, preferably equilateral triangles (FIG. 2C). In the accompanying monochrome drawings, the colors of the various pixels have been indicated by R,G and B for red, green and blue respectively. Although in theory pentagonal pixels could be used, these and similar shapes, for example octagonal pixels, are not favored because they do not close pack on a surface. Hexagonal pixels are especially favored because capsules ideally close pack in a hexagonal grid; square pixels are also favorable.

Part D—Conductive Color Filters between Electrodes

As already indicated, conventional CFA's developed for use in liquid crystal displays comprise a layer of material colored in an appropriate manner and disposed adjacent the viewing surface of the display, "outside" the front electrode, i.e., between the front electrode and the viewer. Such conventional CFA's are manufactured on glass substrates and are formed from a plurality of films (usually referred to as a "stack"), typically including a black mask (usually formed of chromium), red, green and blue colored photoresist layers and a conductive layer, typically formed of indium-tin-oxide (ITO), which forms the front electrode of the display.

Also as already indicated, certain types of electro-optic display, especially encapsulated electrophoretic displays, microcell displays and rotating bichromal member displays, have the advantage that they can be formed on flexible substrates, such as plastic films of poly(ethylene terephthalate) or poly(ethylene naphthalate). While it is technically possible to use conventional CFA's of the type described in the preceding paragraph with electro-optic displays formed on plastic films, such conventional CFA's are not well adapted for such use. A black chromium mask poses difficulties on plastic substrates, since this metal is typically patterned using etchants that tend to harm plastics; accordingly, it is desirable to eliminate the black mask.

It is also desirable, the present inventors have realized, if an "internal" CFA as described in Part B hereof is not employed, to interchange the order of the colored layers and the conductive layer. Such an interchange facilitates manufacturing, since plastic films coated with conductive materials such as ITO are readily available commercially and can be used as starting materials in the process of manufacturing the CFA.

However, such an interchange necessarily places the colored layers between the electrodes of the display and, at any given operating voltage between the electrodes, reduces the voltage across the electro-optic medium itself, since the voltage across the electro-optic medium is equal to the operating voltage minus the voltage drop across the colored layers. The reduced voltage across the electro-optic medium typically slows the switching rate of the medium. Although it is possible to compensate for the reduced voltage across the electro-optic medium by increasing the operating voltage, this is generally undesirable since it increases the energy consumption of the display and may require modification of electrical circuitry to produce and/or handle the increased voltage. Furthermore, the electrical resistivity of many commercial photoresists is so high that a very large, and often unacceptable, increase in operating voltage would be required to compensate for the presence of the colored layers between the electrodes.

Accordingly, it is desirable to increase the conductivity of the material used to form the colored layers so that the resistance of the colored layers does not substantially exceed that of the electro-optic layer, and indeed is desirably less than that of the electro-optic layer. Given the low conductivity of most types of electro-optic media, the colored layers should have a volume resistivity not greater than about $10^{10}$, and preferably not greater than about $10^9$ ohm cm. The colored layers may be made more conductive by doping with conductive nanoparticles, for example nanoparticles of silver, gold, aluminum, platinum or carbon; although these materials are opaque in bulk form, they can be made into nanoparticles small enough (typically less than 10 nm in diameter) that they do not substantially scatter light, and thus do not interfere with the optical problems of the colored layers. Other organic or inorganic pigments that have favorable electrical and optical properties can also be used, as can conductive polymers and other materials, although it is of course necessary to take account of the overall optical properties of the display after addition of these materials. The techniques described in the aforementioned 2003/0011867 may be used to control the conductivity of the colored layers. Also, since the colored layers are disposed between the electrodes of the electro-optic display, the electrical characteristics, and the variation of such characteristics with environmental parameters such as temperature, may affect the operating characteristics of the display in essentially the same way as any other layer, for example a lamination adhesive, disposed between the electrodes of the display. The reader is referred to the aforementioned 2003/0025855 for a detailed summary of the desirable characteristics of lamination adhesives used in electro-optic displays; most of these characteristics are directly applicable to colored layers used as internal color filter arrays in accordance with the present invention.

Part E—Double Release Film

As already indicated, the methods used in liquid crystal displays for incorporation of CFA's are not well adapted for use with other types of electro-optic media. In particular, as already indicated, the techniques used to assemble liquid crystal displays do not transfer well for use with other types of electro-optic media. In the conventional process for assembly of liquid crystal displays, a front assembly is formed comprising a substrate, color filter layers and a conductive layer, and this front assembly is aligned with and secured to a rear assembly comprising pixel electrodes and associated circuitry, a narrow cell gap being maintained between the two assemblies by the use of spacers. This cell gap is then evacuated and filled with the liquid crystal material itself by dipping the combined assemblies into a bath of the liquid crystal material.

Although in theory one could form an encapsulated electrophoretic display in a similar manner, in practice this assembly technique is highly undesirable because when injected into a narrow cell gap, the capsules will not pack closely, as is desirable for optimum optical performance of the resultant display. Instead, it is desirable to coat or print the encapsulated electrophoretic material combined with a polymeric binder in the form of a slurry on to a substrate and then to dry and/or cure the coated or printed layer to form the final layer of electrophoretic medium. Although the coating or printing step can be performed directly on the CFA, there may be problems with some CFA's in achieving proper packing of the capsules and/or sufficient adhesion of the capsules to the CFA.

In one aspect of this invention, the electrophoretic display material, or other solid electro-optic material, is coated, printed, or otherwise deposited on to a release sheet for later transfer to a CFA or other substrate, for example a backplane (see also the aforementioned copending application Ser. No. 10/249,957 and the corresponding International Application PCT/US03/16433). The display material is desirably coated such that there is a thin adhesive layer between the display material and the release sheet; a second adhesive layer may be provided on the opposed side of the display material capsules. To protect the coated composite material during handling, it is desirable to apply a second release sheet over the second adhesive layer.

Figure 3:
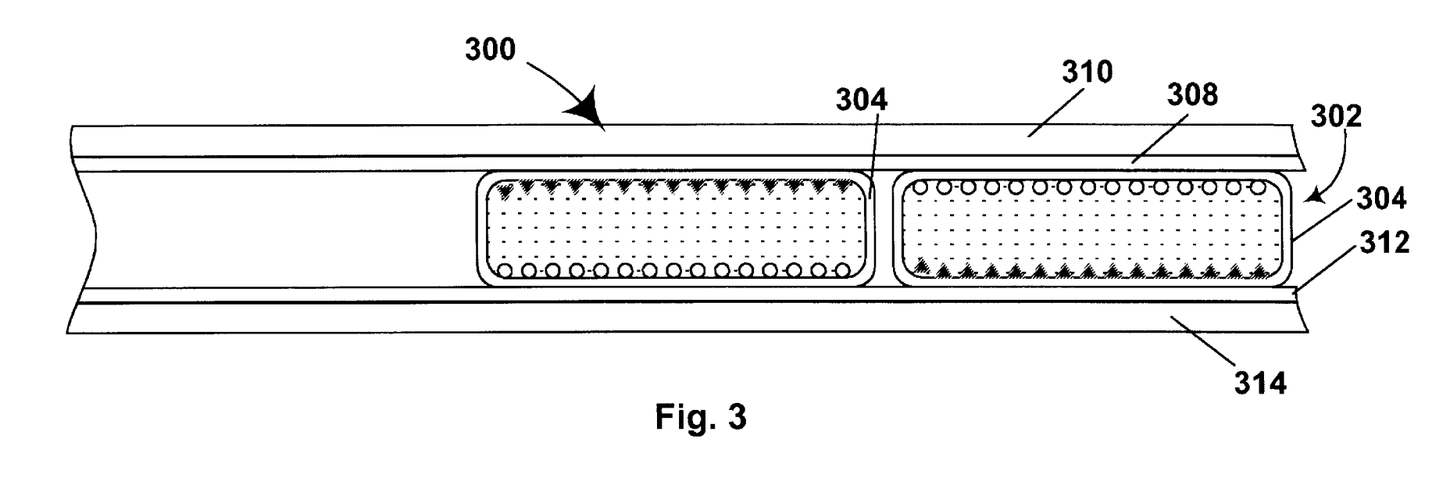
FIG. 3 is a schematic cross-section through a double release film of the present invention.

A preferred double release sheet (generally designated 300) of the present invention is shown in FIG. 3 of the accompanying drawings. This sheet 300 comprises a central layer 302 of electro-optic material, specifically in FIG. 3 a layer comprising capsules 304 in a polymeric binder 306. The capsules 304 may be similar to those described above with reference to FIG. 1. The sheet 300 further comprises a first adhesive layer 308, a first release sheet 310 covering the first adhesive layer 308, a second adhesive layer 312 disposed on the opposed side of the layer 302 from the first adhesive layer 308, and a second release sheet 314 covering the second adhesive layer 312.

The sheet 300 may be formed by first coating a the release sheet 310 with a layer of adhesive which is then dried or cured to form the first adhesive layer 308. Next, a mixture of the capsules 304 and binder 306 is printed or otherwise deposited on the first adhesive layer 308, and then the mixture is dried or cured to form a coherent layer 302. Finally, a layer of adhesive is deposited over the layer 302, dried or cured to form the second adhesive layer 312, and covered by the second release sheet 314.

It will be apparent to those skilled in coating technology that this sequence of operations used to form the sheet 300 is well adapted for continuous production and that, by careful choice of materials and process conditions, it may be possible to carry out the entire sequence of operations in a single pass through conventional roll-to-roll coating apparatus.

To assemble a display using a double release film such as the film 300, one release sheet (typically that on to which the electro-optic material was coated) is peeled away, and the remaining layers of the double release film are attached to a CFA or other front substrate using, for example a thermal, radiation, or chemically based lamination process. Typically, the CFA or front substrate will include a conductive layer which will form the front electrode of the final display. The CFA and the conductive layer may be in either order, but for reasons already discussed, it is preferred that the CFA lie between the conductive layer and the electro-optic layer. The front substrate may include additional layers, such as a UV filter or a protective layer intended to protect the CFA and/or the conductive layer from mechanical damage. Thereafter, the other release sheet is peeled away, thereby exposing the second adhesive layer, which is used to attach the CFA/electro-optic material coating assembly to a backplane. Again, a thermal, radiation, or chemically based lamination process may be used. It will be appreciated that the order of the two laminations described is essentially arbitrary and could be reversed, although it practice it is almost always more convenient to laminate the double release film to the CFA or other front substrate first, and thereafter to laminate the resulting front subassembly to the backplane.

As discussed above, in all CFA-based electro-optic displays, it is desirable to make the distance from the color filter back surface to the optically active layer as small as possible. This minimizes optical losses and mitigates parallax problems. Thus, the lamination adhesive on the front of the display and the capsule wall should both be as thin as possible. It is conceivable that these layers may be reduced to thicknesses approaching 1 μm. Furthermore, it is desirable for the capsules to deform during coating and drying such that they present an effectively flat surface against the color filter array. This will help minimize the chance that light entering through one color pixel leaves through an adjacent (differently colored) pixel after diffusely reflecting form the optically active display material. Moreover, it is desirable to match the index of refraction of all films used in constructing the display stack.

Various display assembly techniques may be employed, including but not limited to wet bond or hot melt lamination processes. In some applications, it is preferable to use repositionable adhesives or air soluble adhesives. In other applications, it is preferable to use radiation, thermal, or chemically curing adhesives. In each assembly technique, however, it is essential to align the CFA sub-pixels to the TFT array electronics on the backplane. In order to achieve high resolution alignment (aligned within better than, say, 10-20 µm), one can use a standard optical alignment system that aligns fiducial marks on the backplane to fiducial marks on the CFA. Once the fiducials on these two substrates are aligned, they are brought together without introducing misalignment and the lamination process takes place. The lamination process may be based on 1. mechanical contact (i.e. pressure sensitive adhesives, either repositionable or otherwise), 2. thermal effects (e.g. hot melt, wet bond, vacuum lamination, etc.), or 3. radiation-based methods (e.g. UV cure).

It will readily be apparent to those skilled in the technology of electro-optic displays that numerous changes and modifications may be made in the process described for forming an electro-optic display from a double release film. For example, in each of the two laminations described, only one of the two components being laminated together need carry an adhesive layer and which component carries the adhesive layer is essentially a matter of process engineering. Thus, in certain cases, it may be convenient to omit one or both of the adhesive layers 308 and 312 from the sheet 300 and instead to place a similar adhesive layer on the CFA, backplane or other substrate being used in the lamination. Also, in some cases it may be possible to omit one release sheet where this would not result in an adhesive layer being exposed to contamination for an extended period. For example, if a double release sheet such as the sheet 300 were formed on a continuous production line and laminated to a color filter array or other substrate a short time after the second adhesive layer 312 was formed, application of the second release sheet 314 could be omitted and the second adhesive layer used to laminate the sheet 300 to the color filter array.

It will also be apparent to those skilled in the technology of electro-optic displays that the double release sheet of the present invention may be regarded as a modified form of the front plane laminate described in the aforementioned copending application Ser. No. 10/249,957 and the corresponding International Application PCT/US03/16433. This front plane laminate comprises, in order, a light-transmissive electrically-conductive layer (typically carried on a polymeric film substrate), a layer of a solid electro-optic medium in electrical contact with the electrically-conductive layer, an adhesive layer, and a release sheet. The double release sheet of the present invention is essentially a modification of such a front plane laminate derived by replacing the electrically-conductive layer thereof with a second release sheet, and optionally an associated second adhesive layer. Accordingly, the double release sheet of the present invention may include any of the optional features of the front plane laminate described in the aforementioned copending application Ser. No. 10/249,957 and the corresponding International Application PCT/US03/16433. For example, the double release sheet may have any one or more of (a) a conductive layer on one of both of its release sheets to permit testing of the electro-optic medium (see FIGS. 2-7 and the associated description of application Ser. No. 10/249,957); (b) a conductor extending through the layer of electro-optic medium (see FIGS. 9 and 10 and the associated description of application Ser. No. 10/249,957); (c) an aperture extending through the layer of electro-optic medium, which aperture may later be filled with a conductive material to provide a conductor as mentioned in (b) (see FIGS. 8 and 18 and the associated description of application Ser. No. 10/249,957); (d) an edge seal (see FIGS. 11-17, 19 and 20 and the associated description of application Ser. No. 10/249,957); and (e) tabs in which the release sheet extends beyond the layer of electro-optic material to facilitate removal of the release sheet (cf. FIGS. 21 and 22 and the associated description of application Ser. No. 10/249,957).

Figure 4:
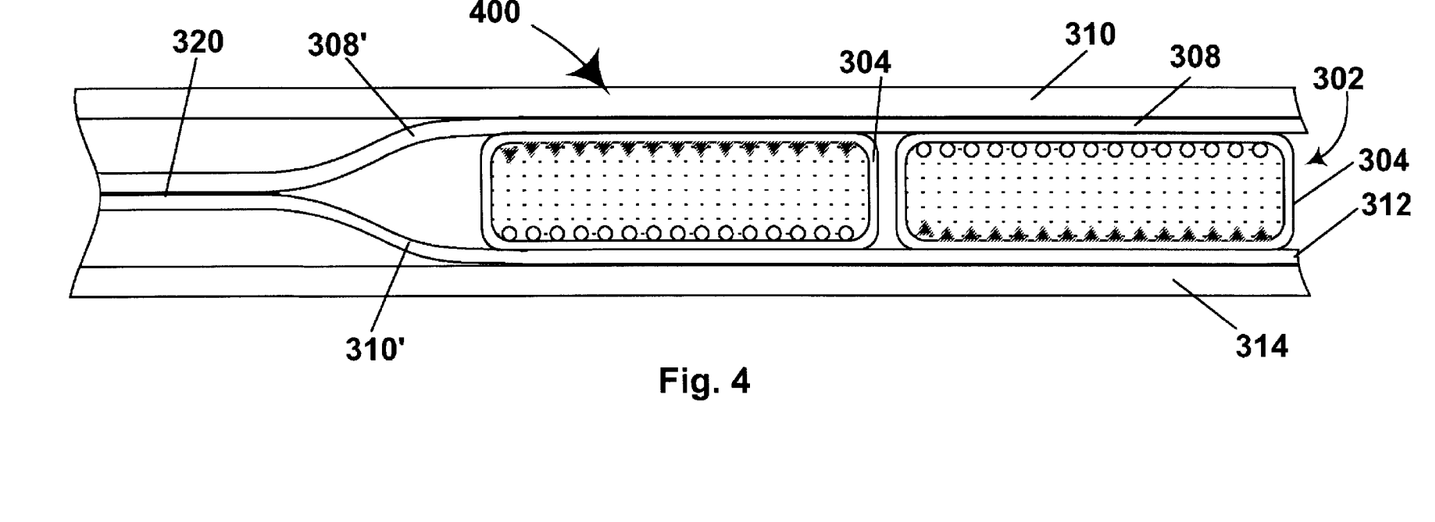
FIG. 4 is a schematic cross-section, similar to that of FIG. 3, through a second release film of the present invention provided with an edge seal.

Edge seals around the perimeter of a display are desirable for display lifetime and ruggedness reasons. The edge seal material may include UV, thermal, or chemically cured adhesives that are compatible with the encapsulated electrophoretic display material. The adhesive may be deposited around the edge of the display using printing processes, automated pipette dispensing techniques, or other similar techniques known by those skilled in the art. In a traditional liquid crystal manufacturing process, this seal material is cured before the liquid crystal is filled into the cell gap. This is unacceptable for an encapsulated display because such an edge seal locks voids (e.g. air gaps) into the laminated display. There are several routes to eliminate this problem. First, after lamination is complete one may fill the edge seal material into the thin gap around the edge of the display. Second, one may only position edge seal material around some fraction of the display edges, perform the lamination, then fill in the remaining edge seal material. These and other edge sealing techniques are described in the aforementioned copending application Ser. No. 10/249,957. However, the double release film of the present invention allows an additional method for providing an edge seal, namely extending the adhesive layers lying on opposed sides of the electro-optic layer beyond the edge of the electro-optic layer, but not beyond the edge of the display. FIG. 4 illustrates an edge seal formed in this manner. FIG. 4 illustrates a display (generally designated 400) formed from a double release film, similar to as the film 300 shown in FIG. 3, by the double lamination process already described. The final display 400 comprises the electro-optic layer 302, a backplane 316 and a CFA 318. The two adhesive layers 308' and 310' extend beyond the edge of the electro-optic layer, but not beyond the edge of the display, so that after the two laminations, the two adhesive layers become bonded together to form an edge seal, designated 320. Edge sealing is often essential in providing a rugged electro-optic display which can withstand wide variations in environmental conditions and it is much simpler to use the existing adhesive layers in this manner to form the required seal, rather than introducing a separate seal material around the outer edge of the display.

Part F—Production of Color Filter Arrays by Photographic Imaging

In another aspect this invention provides a process for preparing a color filter for use in an electro-optic display. The process comprises imaging a color filter pattern on to a photosensitive film, processing the film (if necessary) to reveal the image, then depositing a conductive layer on to the photosensitive film to act as an electrode. The term "photosensitive film" as used herein is not restricted to films which rely upon silver halide chemistry, nor is it restricted to films which are sensitive to visible wavelengths, but includes films sensitive to electromagnetic radiation outside the visible range. If the photosensitive film used is a conventional silver halide film comprising a silver halide emulsion of a substrate, the conductive layer will typically be deposited on the emulsion side of the film. The result is a flexible color filter that can be used as the top plane of an electro-optic display.

The need for preparing CFA's on flexible substrates, and the problems encountered in attempting to modify the conventional processes originally developed for forming CFA's on glass for use with liquid crystal displays have already been discussed above. As already noted, such processes are not well suited to flexible substrates, and the cost of production is also high, comparable to the cost of an amorphous silicon TFT backplane on quartz.

In one embodiment of the invention the image is transferred by contact printing an existing color filter array on glass on to the photographic film. The film is placed on a flat, non-reflective surface with the emulsion side up. The color filter is then placed dye side down on top of the film. The film is exposed with a light source through the color filter. This method requires an existing color filter to act as a master.

Another embodiment of the invention for producing a filter uses a camera to image a pattern onto the film. The pattern could be an existing color filter, in which case it would be backlit. In this case, the camera would be set up to reproduce the image 1:1 on the film. Alternatively, the master could be a large (poster-sized) reflective object, e.g. a high-quality print on paper. In this case, the master would be front-lit, and the camera would be set up to reduce the image to the appropriate size on the film. This method has the advantage of allowing the rapid construction of a CFA from a macroscopic pattern, making it possible to change such parameters as filter density, size of black mask, etc.

Another embodiment of the invention uses a linear array of emissive elements translated across the film in a direction perpendicular to the long axis of the linear array to produce a pattern of stripes on the film. If a black mask is required in this embodiment, the emissive elements could be toggled on and off at the appropriate points to generate dark regions on the film.

In any of the above embodiments, the overall color cast of the filter can be reduced (or enhanced) by applying an appropriate color filter to the illumination source, or by placing filters over the lens of the camera (when used). The density of the filter can be adjusted by increasing or decreasing the film exposure. If the film does not accurately reproduce one or more of the colors in the filter (which is likely), then it will be necessary to adjust the colors in the master. For any film, there will be an inverse transform governed by the spectral response function of the emulsion that will determine the proper colors to use in the master to get the desired colors in the final display.

To complete the construction of a CFA, after one of the processes described above, the film may be processed using the appropriate chemical process. Then, a thin film of indium tin oxide (ITO) or other conductive material can be evaporated on to the emulsion side of the film. Alternately, a transparent conductive polymer, e.g. Baytron (Registered Trade Mark), could be coated on to this surface.

The present invention permits the inexpensive production of CFA's on flexible substrates. Furthermore, using the reduction technique described above, CFA's of arbitrary geometry and color can be produced using very simple and easily available tools, allowing for rapid prototyping of filter modifications.

Part G—Miscellaneous Processes for Production of Color Filter Arrays

This invention relates to various methods for integrating electrophoretic display materials into a CFA based electrophoretic display. The manufacturing strategies of this invention are markedly different from those used in the manufacture of liquid crystal displays.

In a first aspect of the invention, an encapsulated electrophoretic display material is coated directly onto the CFA and the coated CFA is subsequently laminated to a backplane containing pixel electrodes.

The deposition of the encapsulated electrophoretic display material (i.e., a plurality of capsules) may be effected by slot die, meniscus, curtain, or other coating methods directly on to the color filter array. The color filter array may be comprised of a glass or other optically clear substrate (including polymeric substrates and thin, "flexible" glass), a plurality of red, green, and blue color stripes, and a transparent conductor. In some embodiments, the color filter array includes a "black mask", which is a grid of opaque lines that are designed to conceal select undesirable locations on the assembled electronic display. In still other embodiments, the color filter array is comprised of a plurality of red, green, and blue pixels, instead of stripes. The black mask may be situated above or below the color stripes or pixels. In another embodiment, the color filter may include stripes or pixels that are optically clear instead of colored.

It is important to ensure that the encapsulated electrophoretic display material is in intimate contact with the CFA in order to ensure adequate optical coupling between the display material and the color filter. At a minimum, it is required that the distance between the color filter surface and the front surface of the optically active material in the encapsulated electrophoretic display material be substantially smaller than the smallest dimensions of the pixels of the display. For example, for pixels that are 100 µm wide, one should ensure that the distance from the surface of the color filter stripe to the front surface of the optically active material be smaller than, say 10 µm. This gap may be filled with lamination adhesive, a polymeric binder, capsule wall material, thin films above the tinted regions of the color filter, and surface treatments applied to the color filter.

A further aspect of the invention relates to methods for generating regular surface energy patterns on the CFA to influence the packing density of the capsules on the CFA. According to this aspect of the invention, a surface treatment may be applied to a CFA in order to influence the packing of capsules that are subsequently coated directly onto the surface treated CFA. Generally, it is desirable to design the color filter such that there exists a regular surface energy pattern over the surface of the color filter in contact with the encapsulated electrophoretic display material. This helps to ensure that the capsules pack in a way that improves the optical performance of the display.

Alternatively or in addition to such generation of regular surface energy patterns, the surface may be prepared in such a way as to uniformly increase or decrease wettability of this surface. This may be effected by applying an adhesion promoter or suitable surface chemistry, such as 1-propanamine, 3-(trimethoxysilyl) (more systematically named 3-aminopropyltrimethoxysilane), 3-aminopropyldimethyl-ethoxysilane, hexamethyldisilizane or other such materials. Similar surface treatments may also be applied to the surface of the backplane (or other surfaces where variation of wettability is desired, as described below) in order to enhance display properties.

In a particular embodiment of this invention, the CFA may be constructed as follows: 1. pattern red, green, and blue stripes on a substrate, 2. pattern a black mask above the color stripes (the black mask is conventionally situated below the color stripes), and 3. treat the black mask surface such that it becomes non-wetting and the color stripes wetting to the encapsulated electrophoretic display material. Representative surface treatments include octadecatrichlorosilane, a spectrum of other silane and thiol based chemicals, various polytetrafluoroethylene agents, and other materials known to those skilled in the art. The black mask may be made receptive to these agents by including a surface treatment receptive film on the topmost surface of the black mask. For example, a thin gold film may be deposited as the topmost layer of the black mask, and alkanethiols may be deposited onto the gold. The thiol material may be engineered to have a markedly different surface energy than the color stripes, thereby achieving the desired effect.

A further aspect of the invention relates to methods for using patterned surface treatments to influence the packing density of the coated capsules on a continuous electrode. In this aspect, a patterned surface treatment is deposited onto a continuous electrode to influence the packing of subsequently deposited capsules. A patterned surface treatment may be applied onto the continuous electrode on top of the color filter by printing techniques including microcontact, offset, intaglio, flexo-gravure, or other printing techniques known to those skilled in the art. This is an ideal application for printing, as perfect yield on the local scale is not required; local defects are not catastrophic, since proper packing of the capsules on the long range will tend to organize the capsules correctly despite local defects.

In another aspect, this invention relates to the use of monodisperse capsules (capsules that are substantially uniform in size, for example in which at least about 95 percent of the capsules have diameters which do not differ by more than about 20 percent, and preferably by not more than about 10 percent, from the average diameter) in electrophoretic displays. The use of such monodisperse capsules is especially desirable in conjunction with the surface treatment aspects of this invention already discussed, since with polydisperse capsules, regularly patterned surface treatments become far less effective at reordering the deposited film into a regular pattern, whether these surface treatments are deposited onto a color filter black mask or onto a continuous electrode.

These aspects of the present invention all serve to improve the optical performance of a encapsulated electrophoretic display by influencing the packing of capsules coated down onto a front electrode. The surface treatments used to accomplish this task are either built into the color filter black mask, or are printed directly onto the continuous electrode in contact with the display material.

Another aspect of the present invention relates to novel surface treatments that enable filling a cell gap in between a CFA and a backplane with encapsulated electrophoretic display material. The novel surface treatment technique of the present invention enables the use of more traditional liquid display manufacturing techniques. In this aspect of the invention, a surface agent that promotes capsule wetting is applied to the CFA, and a surface agent that promotes capsule dewetting is applied to the backplane. Just as in traditional liquid crystal manufacture, the color filter array and the backplane are assembled with precision spacers in between them, and the edges are sealed with epoxy or other edge-sealing agent. The encapsulated electrophoretic display material in then drawn into the space between the color filter array and the backplane using pump, vacuum, or other similar technique known to those skilled in the art. However, because of the presence of the surface treatments on the CFA and the backplane, the capsules preferentially pack tightly against the front surface of the display (the color filter surface), and tend to dewet and move away from the backplane surface. This invention ensures that the encapsulated electrophoretic display material packs against the front viewing surface, which provides for markedly improved optical performance compared to techniques in which the material packs against the backplane, or packs with no preference for either the CFA or the backplane surface. Surface forces are used to draw capsules to the front electrode, but other forces including gravitational, electrophoretic, and magnetic may be employed to accomplish this task.

This aspect of the present invention improves the optical performance of the display by influencing the packing of capsules injected into a cell gap formed between a front electrode and a backplane. It enables the use of traditional display filling technologies with encapsulated electrophoretic displays.

The electrophoretic media used in various aspects of the present invention may be of any of the types described in the aforementioned E Ink and MIT patents and applications, to which the reader is referred for further information.

Those skilled in the part of electro-optic displays will appreciate that numerous changes, improvements and modifications can be made in the preferred embodiments of the invention already described without departing from the scope of the invention. Accordingly, the whole of the foregoing description is intended to be construed in an illustrative and not in a limitative sense.

The invention claimed is:

1. An article of manufacture comprising:
    a layer of a solid electro-optic medium having first and second surfaces on opposed sides thereof;
    a first adhesive layer on the first surface of the layer of solid electro-optic medium;
    a release sheet disposed on the opposed side of the first adhesive layer from the layer of solid electro-optic medium; and
    a second adhesive layer on the second surface of the layer of solid electro-optic medium.

2. An article of manufacture according to claim 1 further comprising a second release sheet disposed on the opposed side of the second adhesive layer from the layer of solid electro-optic medium.

3. An article of manufacture according to claim 1 wherein the electro-optic medium is an electrophoretic medium comprising a plurality of capsules, each capsule comprising a suspending fluid, a plurality of electrically charged particles suspended in the suspending fluid and capable of moving therethrough on application of an electric field to the suspending fluid, and a capsule wall surrounding the suspending fluid and the electrically charged particles.

4. An article of manufacture according to claim 1 wherein the first and second adhesive layers extend beyond the periphery of the layer of electro-optic medium.

5. A process for forming an electro-optic display, the process comprising:
    providing an article of manufacture comprising a layer of a solid electro-optic medium having first and second surfaces on opposed sides thereof, a first adhesive layer on the first surface of the layer of solid electro-optic medium, a release sheet disposed on the opposed side of the first adhesive layer from the layer of solid electro-optic medium; and a second adhesive layer on the second surface of the layer of solid electro-optic medium;
    laminating the article to a front substrate via the second adhesive layer, thereby forming a front subassembly;
    removing the release sheet from the front subassembly; and
    laminating the front subassembly via the first adhesive layer to a backplane comprising at least one electrode, thereby forming the electro-optic display.

6. A process according to claim 5 wherein the front substrate comprises an electrode.

7. A process according to claim 5 wherein the front substrate comprises a color filter array.

8. A process according to claim 5 wherein the article of manufacture comprises a second release sheet covering the second adhesive layer, and the process comprises removing the second release sheet from the second adhesive layer prior to laminating the article to the front substrate.

9. A process according to claim 5 wherein the first and second adhesive layers of the article of manufacture extend beyond the periphery of the layer of electro-optic medium, and wherein during the process the peripheral portions of the first and second adhesive layers are adhered to each other, thereby forming an edge seal around the electro-optic medium.

10. An article of manufacture according to claim 1 wherein the electro-optic medium is an electrophoretic medium comprising a suspending fluid, and a plurality of electrically charged particles suspended in the suspending fluid and capable of moving therethrough on application of an electric field to the suspending fluid.

11. An article of manufacture according to claim 10 wherein the suspending fluid and the plurality of electrically charged particles are present as a plurality of discrete droplets and a continuous phase of polymeric material surrounds the droplets.

12. An article of manufacture according to claim 10 wherein the suspending fluid and the plurality of electrically charged particles are retained within a plurality of cavities formed in a carrier medium.

13. An article of manufacture according to claim 1 wherein the electro-optic medium is a rotating bichromal member medium or an electrochromic medium.

14. An article of manufacture comprising:
a layer of a solid electro-optic medium having first and second surfaces on opposed sides thereof, the electro-optic medium being an electrophoretic medium comprising a suspending fluid and a plurality of electrically charged particles suspending in the suspending fluid and capable of moving therethrough on application of an electric field to the suspending fluid, wherein the suspending fluid and the plurality of electrically charged particles are present as a plurality of discrete droplets and a continuous phase of polymeric material surrounds the droplets;
a first release sheet in contact with the first surface of the layer of solid electro-optic medium; and
a second release sheet in contact with the second surface of the layer of solid electro-optic medium.

15. An article of manufacture comprising:
a layer of a solid electro-optic medium having first and second surfaces on opposed sides thereof, wherein the electro-optic medium is a rotating bichromal member medium or an electrochromic medium;
a first release sheet in contact with the first surface of the layer of solid electro-optic medium; and
a second release sheet in contact with the second surface of the layer of solid electro-optic medium.

16. A process according to claim 5 wherein the electro-optic medium is an electrophoretic medium comprising a suspending fluid, and a plurality of electrically charged particles suspended in the suspending fluid and capable of moving therethrough on application of an electric field to the suspending fluid.

17. A process according to claim 16 wherein the suspending fluid and the plurality of electrically charged particles are present as a plurality of discrete droplets and a continuous phase of polymeric material surrounds the droplets.

18. A process according to claim 16 wherein the suspending fluid and the plurality of electrically charged particles are retained within a plurality of cavities formed in a carrier medium.

19. A process according to claim 5 wherein the electro-optic medium is a rotating bichromal member medium or an electrochromic medium.

* * * * *